United States Patent
Hameed et al.

(10) Patent No.: US 8,726,044 B2
(45) Date of Patent: May 13, 2014

(54) ENCRYPTING DATA ON PRIMARY STORAGE DEVICE AND ON CACHE STORAGE DEVICE

(75) Inventors: Sohail Hameed, Houston, TX (US); Balaji Natrajan, Spring, TX (US); Michael G Myrah, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/562,821

(22) Filed: Jul. 31, 2012

(65) Prior Publication Data

US 2014/0040637 A1     Feb. 6, 2014

(51) Int. Cl.
    *G06F 11/30*     (2006.01)
    *G06F 12/14*     (2006.01)

(52) U.S. Cl.
    USPC .......................................................... 713/193

(58) Field of Classification Search
    USPC ................................................. 713/189–194
    See application file for complete search history.

(56) References Cited

U.S. PATENT DOCUMENTS

| | | | | |
|---|---|---|---|---|
| 6,754,857 | B2 * | 6/2004 | Liang | 714/719 |
| 7,580,897 | B2 * | 8/2009 | Sakamura et al. | 705/67 |
| 8,200,965 | B2 | 6/2012 | Fujibayashi et al. | |
| 2003/0177386 | A1 * | 9/2003 | Cuomo et al. | 713/201 |
| 2005/0240821 | A1 * | 10/2005 | Martin | 714/36 |
| 2007/0050293 | A1 * | 3/2007 | Peterka et al. | 705/50 |
| 2008/0059789 | A1 * | 3/2008 | Lucidarme | 713/153 |
| 2009/0125790 | A1 * | 5/2009 | Iyer et al. | 714/773 |
| 2009/0271638 | A1 | 10/2009 | Kawakami et al. | |
| 2010/0082898 | A1 | 4/2010 | Mangold et al. | |
| 2010/0241841 | A1 * | 9/2010 | Buer | 713/2 |
| 2010/0287383 | A1 | 11/2010 | Conte et al. | |
| 2010/0287385 | A1 | 11/2010 | Conte et al. | |
| 2011/0302400 | A1 * | 12/2011 | Maino et al. | 713/2 |

OTHER PUBLICATIONS

Performance Analysis of Data Encryption Algorithms Abdel-Karim Al Tamimi http://www.cs.wustl.edu/~jain/cse567-06/ftp/encryption_perf/.*

Blowfish—Block Cipher Speed Comparisons Bruce Schneier http://www.schneier.com/blowfish-speed.html.*

M.A. El-Fatouh et al., "A New Narrow Block Mode of Operations for Disk Encryption," Procs. of IAS '08 Proceedings of the 2008 The Fourth International Conference on Information Assurance and Security, pp. 126-131, Sep. 2008.

* cited by examiner

*Primary Examiner* — Christopher Revak
*Assistant Examiner* — Vadim Savenkov

(57) ABSTRACT

A primary storage device stores a first encrypted version of data. The first encrypted version of the data is encrypted in accordance with a first encryption-decryption approach. A cache storage device for the primary storage device stores a second encrypted version of the data. The second encrypted version of the data is encrypted in accordance with a second encryption-decryption approach different than the first encryption-decryption approach.

11 Claims, 3 Drawing Sheets

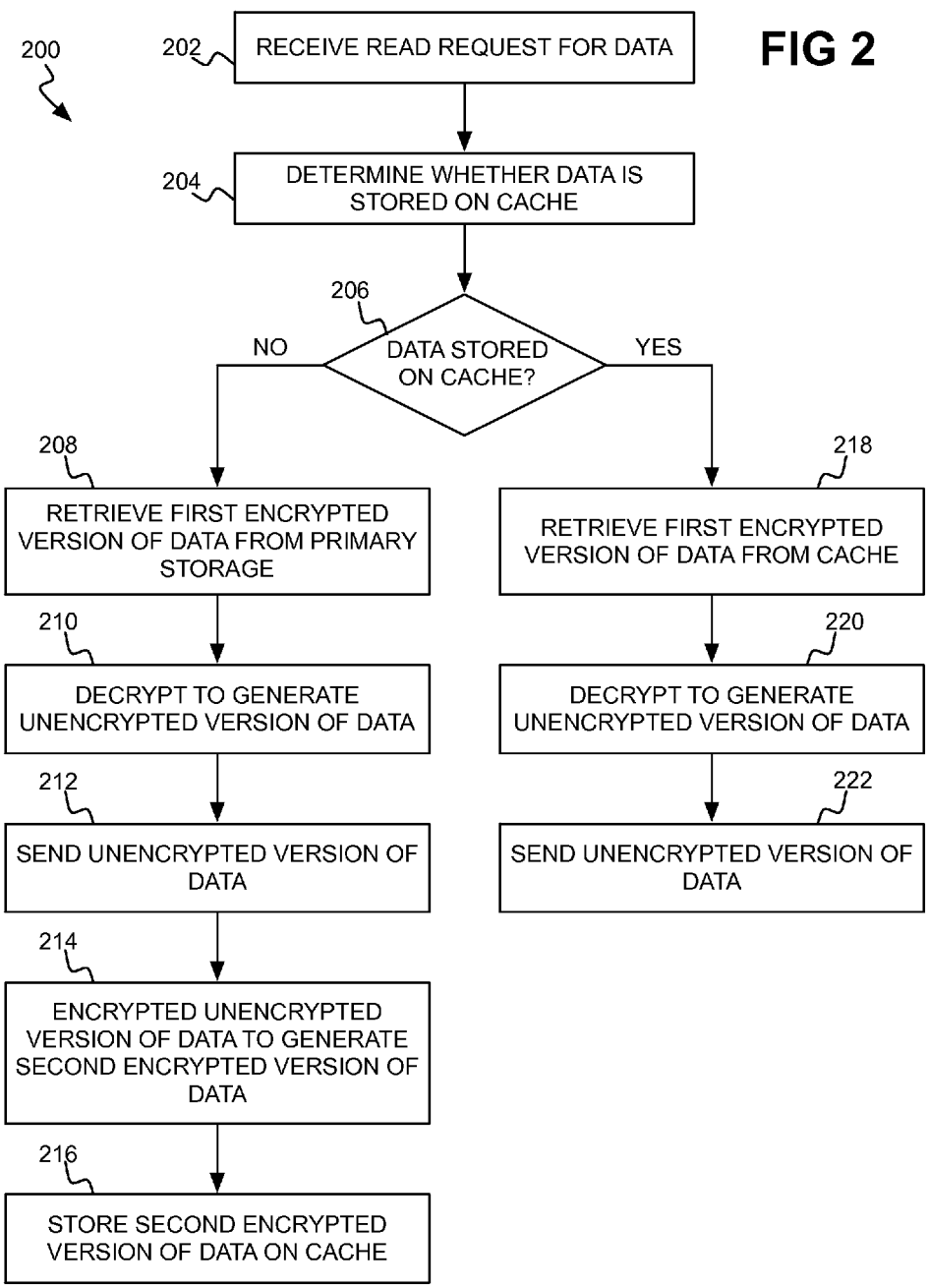

ENCRYPTING DATA ON PRIMARY STORAGE DEVICE AND ON CACHE STORAGE DEVICE

BACKGROUND

Data is stored on storage devices for a variety of different business, personal, and other purposes. Non-volatile storage devices such as hard disk drives can be relatively slow in performance, however, degrading overall system performance when data is written to or retrieved from a storage device. Therefore, a cache storage device, which is often relatively fast volatile semiconductor memory, can be used to improve overall system performance by caching the data retrieved from and to be written to a primary, non-volatile storage device.

BRIEF DESCRIPTION OF THE DRAWINGS

FIG. 2 is a flowchart of an example method for reading data in relation to the example storage system of FIG. 1.

DETAILED DESCRIPTION

As noted in the background section, cache storage devices are employed with primary storage devices to improve overall system performance. Another concern with the storage of data in general is security. Therefore, data is often encrypted prior to storage. Encryption, however, results in a degradation of overall system performance, because the data has to be decrypted when being read, and encrypted when being written. When a cache storage device is used in conjunction with a primary storage device, such degradation is accentuated if the data is encrypted both at the primary storage device and at the cache storage device. To mitigate this performance degradation, the data may just be encrypted at the primary storage device but not at the cache storage device, but doing so creates a security issue due to the cache storage device storing unencrypted data.

Techniques disclosed herein mitigate this security issue while decreasing the performance degradation resulting from storing encrypting data at both the primary storage device and the cache storage device. Existing techniques encrypt data using the same encryption-decryption approach, or algorithm, at both the primary storage device and the cache storage device. To ensure maximum data security, the encryption-decryption approach is often a "strong," or very secure approach that is nearly impenetrable to hacking. However, in general, the more secure a given encryption-decryption approach is, the greater the performance degradation that results, because more secure encryption-decryption approaches are generally more processing intensive and thus take more time to perform.

By comparison, techniques disclosed herein use different encryption-decryption approaches for the primary storage device and the cache storage device. The encryption-decryption approach for the primary storage device is a more secure approach that is more processing intensive and takes more time to perform than the approach for the cache storage device. Because the primary storage device is usually a non-volatile storage device, this ensures that the primary copy of the data is encrypted in a manner that can be nearly impenetrable to hacking. Because the cache storage device is usually a volatile storage device that at any given time stores just a portion of the data in typically a fragmented manner, and can lose its contents once power is removed if it is not backed up by a battery, security is not overly compromised even though the encryption-decryption approach for the cache storage device is less secure.

Figure 1:
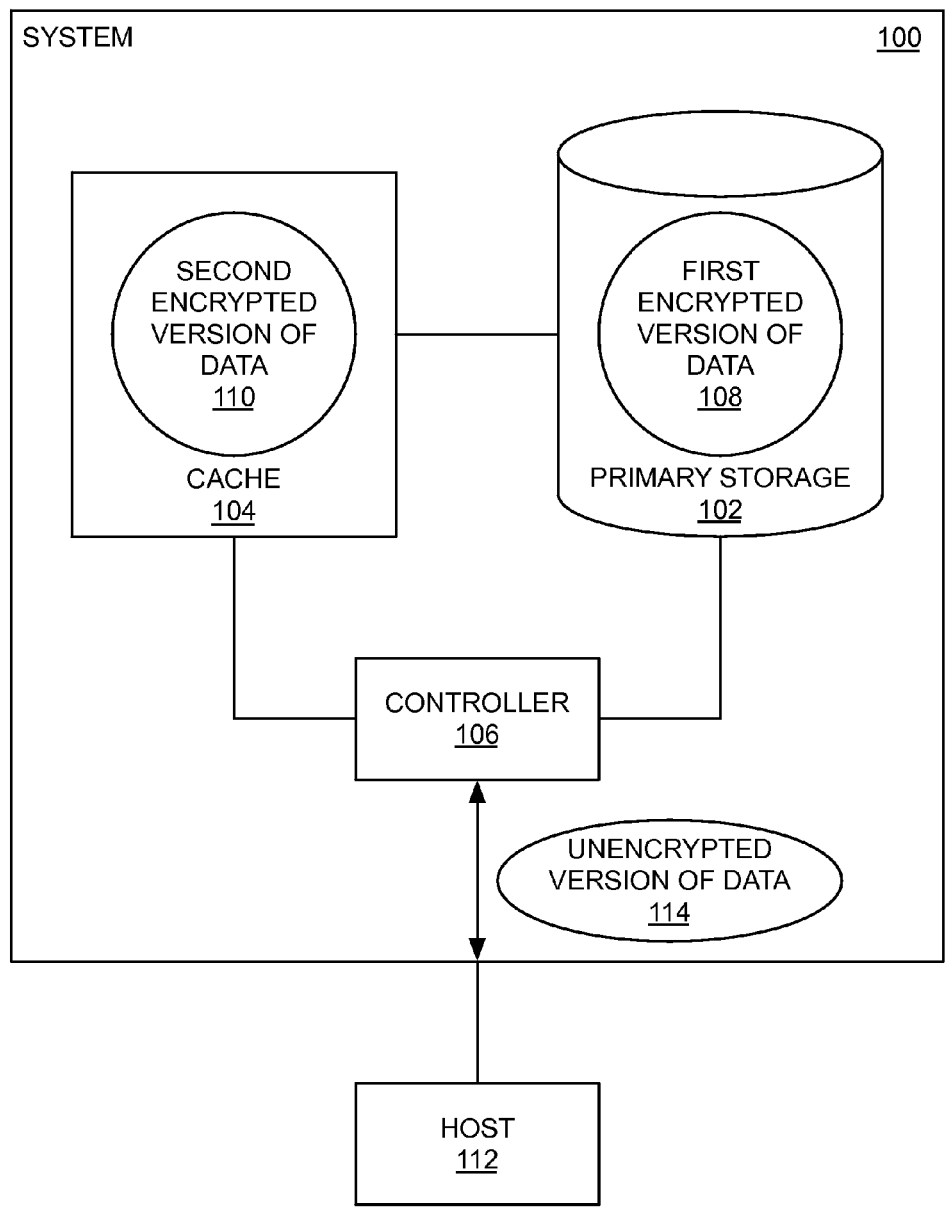
FIG. 1 is a diagram of an example storage system in which data is encrypted differently for storage at a primary storage device than at a cache storage device.

FIG. 1 shows an example storage system 100. The storage system 100 includes a primary storage device 102, a cache storage device 104, and a storage controller 106. The primary storage device 102 can be a relatively high capacity non-volatile storage device, such as a hard disk drive. The primary storage device 102 can encompass multiple such storage devices arranged in a storage-area network (SAN), a redundant array of independent disks (RAID), and so on. The cache storage device 104 can be a relatively low capacity volatile storage device, such as volatile semiconductor memory like dynamic random access memory (DRAM). The storage controller 106 can be or include a general purpose processor, as well as a special purpose controller like a field-programmable gate array (FPGA), an application-specific integrated circuit (ASIC), and so on.

Data is stored on the primary storage device 102, and is cached by the cache storage device 104. As such, overall performance of the storage system 100 is improved. General operation of the primary storage device 102 and the cache storage device 104 is first described without respect to the encryption of data. When data is read from the primary storage device 102, if the data in question is already in the cache storage device 104, then the data is read directly from the cache storage device 104 without accessing the primary storage device 102. If the data is not in the cache storage device 104, then the data is read from the primary storage device 102 and is cached in the cache storage device 104. The storage controller 106 may perform this read-oriented functionality in relation to the storage devices 102 and 104.

When data is written to the primary storage device 102, the data is in general stored first in the cache storage device 104 without accessing the primary storage device 102. If the data is in the cache storage device 104 at the time of such writing, the writing action can be referred to as an updating of the data within the cache storage device 104. Periodically, the data within the cache storage device 104 is sent to the primary storage device 102 for storage on the primary storage device 102. For instance, if the cache storage device 104 is full, existing data on the primary storage device 102 may be sent to the primary storage device 102 for storage to free up space on the cache. At times the primary storage device 102 may be updated based on the contents of the cache storage device 104 when, for example, the cache storage device 104 is flushed. The storage controller 106 may perform this write-oriented functionality in relation to the storage devices 102 and 104.

The primary storage device 102 stores what is referred to herein as a first encrypted version of data 108, whereas the cache storage device 104 stores what is referred to herein as a second encrypted version of data 110. The first encrypted version of data 108 is encrypted in accordance with a first encryption-decryption approach, whereas the second encrypted version of data 110 is encrypted in accordance with a second encryption-decryption approach different than the first approach. The first encryption-decryption approach can be more secure but more processing intensive and slower to perform than the second encryption-decryption approach. The encryption-decryption approaches may be different algorithms, the same algorithm but in different versions thereof (such as a 256-bit approach versus a 40-, 64-, or 128-bit approach), and so on. The storage controller 106 may perform encryption and decryption functionality in accordance with both approaches in relation to the storage devices 102 and 104.

A host device 112 is communicatively connected to the storage system 100, such as via a direct connection or over a network. The host device 112 may be a desktop or laptop computer, or another type of computing device, for instance. The host device 112 sends data to the storage system 100 for storage, and retrieves data stored on the storage system 100. The data sent to or received from the host device 112 at the storage system 100 itself, such as at the storage controller 106 thereof, is referred to herein as an unencrypted version of data 114. The unencrypted version of data 114 in some implementations is completely unencrypted at some point within the storage system 100 prior to transmission to the host device 112 or subsequent to reception from the host device 112, although the data may be encrypted during transit to or from the host device 112.

FIG. 2 shows an example method 200 for reading data from the storage system 100. The method 200 can be implemented as hardware-executable instructions stored on a non-transitory computer-readable data storage medium. For instance, the storage controller 106 can execute the hardware-executable instructions to perform the method 200 to read data from the storage system 100.

A read request for a particular piece of data, such as a particular block of data, which is stored on the primary storage device 102 is received (202). The read request may be received from the host device 112, for instance. The method 200 determines whether this data is stored within the cache storage device 104 (204). If the data is stored within the cache storage device 104, then what is referred to as a cache hit occurs, and the primary storage device 102 does not have to be accessed to retrieve the data. If the data is not stored within the cache storage device 104, however, then what is referred to as a cache miss occurs, and the primary storage device 102 does have to be accessed to retrieve the particular piece of data in question.

If the data is not stored on the cache storage device 104 (206), then the method 200 retrieves the first encrypted version of the data 108 from the primary storage device 102 (208). The first encrypted version of the data 108 is decrypted in accordance with the first encryption-decryption approach to generate the unencrypted version of the data 114 (210). This unencrypted version of the data 114 is sent to fulfill the read request (212). Furthermore, the unencrypted version of the data 114 that was generated in part 210 is encrypted in accordance with the second encryption-decryption approach to generate the second encrypted version of the data 110 (214). The second encrypted version of the data 110 is stored on the cache storage device (104), so that subsequent read requests for the data in question do not have to be fulfilled by accessing the primary storage device 102.

By comparison, if the data is stored on the cache storage device 104 (206), then the method 200 retrieves the second encrypted version of the data 110 from the cache storage device 104 (218). The second encrypted version of the data 110 is decrypted in accordance with the second encryption-decryption approach to generate the unencrypted version of the data 114 (220). This unencrypted version of the data 114 that was generated in part 220 is sent to fulfill the read request (222). The primary storage device 102 thus does not have to be accessed, in other words, to retrieve the data in question in fulfillment of the read request.

Figure 3A:
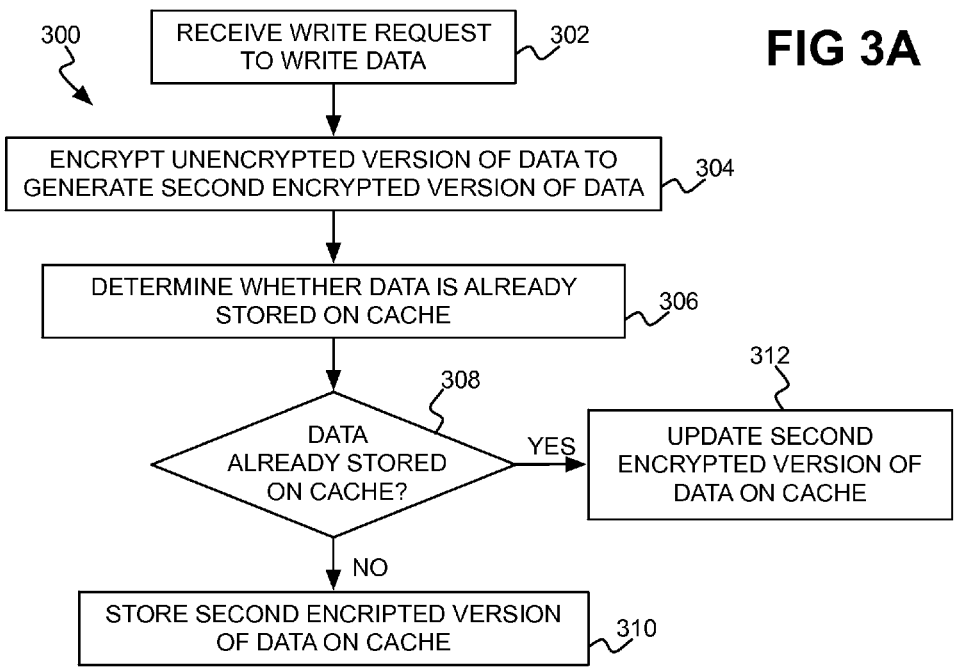
FIGS. 3A and 3B are flowcharts of example methods for writing data in relation to the example storage system of FIG. 1.
Figure 3B:
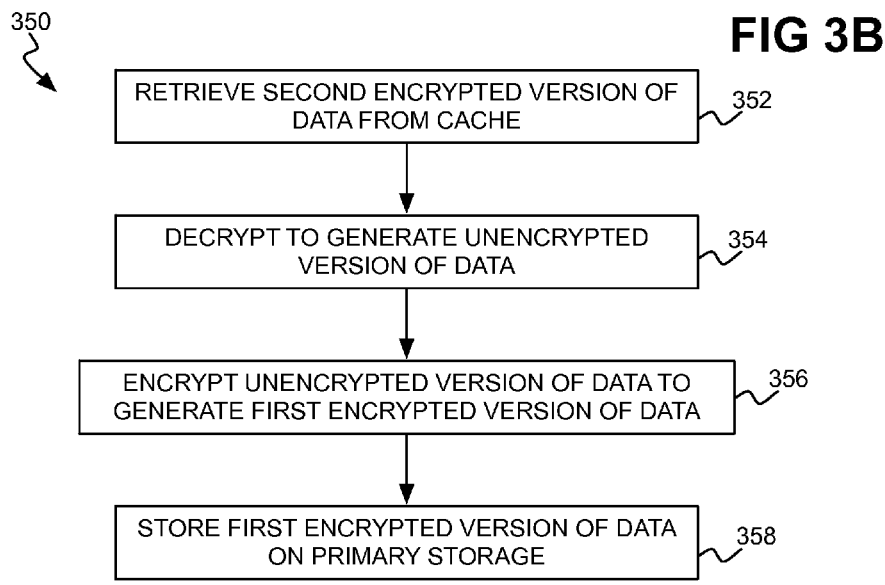

FIGS. 3A and 3B show example methods 300 and 350, respectively, for writing data to the storage system 100. The methods 300 and 350 can each be implemented as hardware-executable instructions stored on a non-transitory computer-readable data storage medium. The storage controller 106 can execute these hardware-executable instructions to perform the methods 300 and 350 to write data to the storage system 100.

In the method 300, a write request to write a particular piece of data, such as a particular block of data, on the primary storage device 102 is received (302). The write request may be received from the host device 112, for instance. The data may be received as the unencrypted version of the data 114, or the data after receipt may be processed to generate the unencrypted version of the data 114. The unencrypted version of data 114 is encrypted in accordance with the second encryption-decryption approach to generate the second encrypted version of data 110 (304).

In some implementations, the method 300 determines whether the data is already stored on the cache storage device 104 (306). If the data is not already stored on the cache storage device 104 (308), which is referred to as a cache miss, then the second encrypted version of the data 110 that was generated in part 304 is stored on the cache storage device 104 (310). If the data is already stored on the cache storage device 104 (308), which is referred to as a cache hit, then the second encrypted version of the data 110 already stored on the cache storage device 104 is updated in accordance with the second encrypted version of the data 110 that was generated in part 304 (312). The updating can be considering storing, such that it can be said that the second encrypted version of data 110 generated in part 304 is stored on the cache storage device 104 regardless of whether the data is already stored on the cache storage device 104.

As noted above, the cache storage device 104 typically has a lesser storage capacity than the primary storage device 102. As such, when new data is to be stored on the cache storage device 104, often the cache storage device 104 is already full. Therefore, data has to be moved from the cache storage device 104 back to the primary storage device 102 to free up space on the cache storage device 104 so the new data can be stored on the cache storage device 104. Such movement may have to occur prior to part 216 of the method 200 being performed, for instance, or prior to part 310 of the method 300 being performed.

Furthermore, when data is written to and/or updated on the cache storage device 104, any copies of the data on the primary storage device 102 become stale, meaning that these latter copies are no longer valid. Therefore, periodically such data has to be copied from the cache storage device 104 back to the primary storage device 102. In addition, as noted above, the cache storage device 104 may be volatile storage. Therefore, when the storage system 100 is to be reset or shutdown, any data written to and/or updated on the cache storage device 104 that is not stored on the primary storage device 102, or is stored on the primary storage device 102 but is stale, also has to be copied from the cache storage device 104 back to the primary storage device 102. This process is referred to as flushing, and may be performed in other situations as well.

The method 350 is performed in relation to a particular piece of data, such as a particular block of data, when the data in question has to be copied or moved from the cache storage device 104 to the primary storage device 102. The second encrypted version of data 110 is retrieved from the cache storage device 104 (352). The second encrypted version of data 110 is decrypted in accordance with the second encryption-decryption approach to generate the unencrypted version of data 114 (354). The unencrypted version of data 114 generated in part 354 is then encrypted in accordance with the first encryption-decryption approach to generate the first encrypted version of data 108 (356), which is stored on the primary storage device 102.

The techniques disclosed herein thus store encrypted versions of the data on both the primary storage device 102 and the cache storage device 104, but in accordance with different encryption-decryption approaches. In doing so, these techniques improve overall system performance with a minimal degradation in security. System performance is improved because the second encryption-decryption approach used in relation to the cache storage device 104 can be a faster approach than the first encryption-decryption approach used in relation to the primary storage device 102.

Even where the second encryption-decryption approach is less secure than the first encryption-decryption approach, however, the degradation in security can be minimal for one or more of at least the following reasons. First, the cache storage device 104 can be a volatile storage device that loses its contents when power is removed therefrom. Second, the cache storage device 104 stores less data than the primary storage device 102. Third, the cache storage device 104 may store its data in a fragmented manner (or just fragments of the data) as compared to the primary storage device 102.

We claim:

1. A method comprising:
   in response to a storage controller of a storage system including a primary storage device and a cache storage device receiving a read request from a host for data stored on primary storage device to which the storage controller is directly connected within the storage system and that is a non-volatile storage device, determining by the storage controller whether the data is stored on the cache storage device to which the storage controller is directly connected within the storage system, that is for the primary storage device, and that is a volatile storage device having a lesser capacity and that is more quickly accessed than the primary storage device;
   in response to the storage controller determining that the data is not stored on the cache storage device,
      retrieving, by the storage controller, a first encrypted version of the data from the primary storage device, the first encrypted version of the data encrypted in accordance with a first encryption-decryption approach;
      decrypting, by the storage controller, the first encrypted version of the data in accordance with the first encryption-decryption approach to generate an unencrypted version of the data;
      sending, by the storage controller the unencrypted version of the data to the host;
      encrypting, by the storage controller, the unencrypted version of the data in accordance with a second encryption-decryption approach that is selected to be less processing intensive and that takes less time to perform than the first encryption-decryption approach in consideration of the cache storage device being faster than the primary storage device, to generate a second encrypted version of the data, the second encryption-decryption approach selected to be less secure than the first encryption-decryption approach in consideration of the cache storage device being volatile whereas the primary storage device is non-volatile; and
      storing, by the storage controller, the second encrypted version of the data on the cache storage device.

2. The method of claim 1, further comprising:
   in response to the storage controller determining that the data is stored on the cache storage device,
      retrieving, by the storage controller, the second encrypted version of the data from the cache storage device;
      decrypting, by the storage controller, the second encrypted version of the data in accordance with the second encryption-decryption approach to generate the unencrypted version of the data; and
      sending, by the storage controller, the unencrypted version of the data to the host.

3. A non-transitory computer-readable data storage medium storing hardware-executable instructions, the medium including instructions, which when executed, cause a storage controller of a storage system including a primary storage device and a cache storage device to:
   in response to receipt of a write request from a host to write data onto the primary storage device to which the storage controller is directly connected within the storage system and that is a non-volatile storage device;
   encrypt an unencrypted version of the data in accordance with a second encryption-decryption technique to generate a second encrypted version of the data;
   store the second encrypted version of the data on a cache storage device to which the storage controller is directly connected within the storage system, that is a volatile storage device having a lesser capacity and that is more quickly accessed than the primary storage device, and that is for the primary storage device;
   encrypt the unencrypted version of the data in accordance with a first encryption-decryption technique that is selected to be more processing intensive and takes more time to perform than the second encryption-decryption technique in consideration of the primary storage device being slower than the cache storage device, to generate a first encrypted version of the data, the first encryption-decryption technique selected to be more secure than the second encryption-decryption technique in consideration of the primary storage device being non-volatile whereas the cache storage device is volatile; and
   store the first encrypted version of the data on the primary storage device.

4. The non-transitory computer-readable data storage medium of claim 3, wherein to encrypt the unencrypted version of the data in accordance with the first encryption-decryption technique and to store the first encrypted version of the data on the primary storage device are part of a task periodically performed to one or more of flush the cache storage device and update the primary storage device.

5. The non-transitory computer-readable data storage medium of claim 4, further comprising, as part of the task and prior to encrypt the unencrypted version of the data in accordance with the first encryption-decryption technique and store the first encrypted version of the data on the primary storage device:
   retrieve the second encrypted version of the data from the cache storage device; and
   decrypt the second encrypted version of the data in accordance with the second encryption-decryption approach to generate the unencrypted version of the data that is encrypted in accordance with the first encryption-decryption technique to generate the first encrypted version of the data that is stored on the primary storage device.

6. The non-transitory computer-readable data storage medium of claim 3, further comprising, in response to receipt of the write request to write the data onto the primary storage device:
  determine whether the data is already stored on the cache storage device for the primary storage device,
  wherein to store the second encrypted version of the data on the cache storage device comprises to update the second encrypted version of the data on the cache storage device where the data is already stored on the cache storage device.

7. A storage system comprising:
  a primary storage device that is a non-volatile storage device to store a first encrypted version of data, the first encrypted version of the data encrypted in accordance with a first encryption-decryption approach;
  a cache storage device that is for the primary storage device and that is a volatile storage device having a lesser capacity and that is more quickly accessed than the primary storage device, to store a second encrypted version of the data, the second encrypted version of the data encrypted in accordance with a second encryption-decryption approach that is selected to be less processing intensive and that takes less time to perform than the first encryption-decryption approach in consideration of the cache storage device being faster than the primary storage device and that is selected to be less secure than the first encryption-decryption approach in consideration of the cache storage device being volatile whereas the primary storage device is non-volatile; and
  hardware that is a storage controller directly connected to the primary storage device and to the cache storage device to generate one or more of the first encrypted version of the data and the second encrypted version of the data from an unencrypted version of the data and to generate the unencrypted version of the data from one or more of the first encrypted version of the data and from the second encrypted version of the data.

8. The storage system of claim 7, wherein in response to receiving a read request for the data, the hardware is to:
  determine whether the data is stored on the cache storage device;
  where the data is not stored on the cache storage device,
    retrieve the first encrypted version of the data from the primary storage device;
    decrypt the first encrypted version of the data in accordance with the first encryption-decryption approach to generate the unencrypted version of the data;
    send the unencrypted version of the data;
    encrypt the unencrypted version of the data in accordance with the second encryption-decryption approach to generate the second encrypted version of the data; and
    store the second encrypted version of the data on the cache storage device.

9. The storage system of claim 8, wherein in response to receiving the read request for the data, the hardware is further to:
  where the data is stored on the cache storage device,
    retrieve the second encrypted version of the data from the cache storage device;
    decrypt the second encrypted version of the data in accordance with the second encryption-decryption approach to generate the unencrypted version of the data; and
    send the unencrypted version of the data.

10. The storage system of claim 7, wherein in response to receiving a write request regarding the data, the hardware is to:
  encrypt the unencrypted version of the data in accordance with the second encryption-decryption technique to generate the second encrypted version of the data; and
  store the second encrypted version of the data on the cache storage device.

11. The storage system of claim 10, wherein the hardware is further to periodically:
  retrieve the second encrypted version of the data from the cache storage device;
  decrypt the second encrypted version of the data in accordance with the encryption-decryption approach to generate the unencrypted version of the data;
  encrypt the unencrypted version of the data in accordance with the first encryption-decryption technique to generate the first encrypted version of the data; and
  store the first encrypted version of the data on the cache storage device.

* * * * *